(12) United States Patent
Dolan et al.

(10) Patent No.: US 10,943,229 B2
(45) Date of Patent: Mar. 9, 2021

(54) AUGMENTED REALITY HEADSET AND DIGITAL WALLET

(71) Applicant: Bank of America Corporation, Charlotte, NC (US)

(72) Inventors: Heather Dolan, Sarasota, FL (US); Victoria L. Dravneek, Charlotte, NC (US); Zafer Mohamed, Charlotte, TN (US)

(73) Assignee: Bank of America Corporation, Charlotte, NC (US)

( * ) Notice: Subject to any disclaimer, the term of this patent is extended or adjusted under 35 U.S.C. 154(b) by 632 days.

(21) Appl. No.: 15/363,692

(22) Filed: Nov. 29, 2016

(65) Prior Publication Data

US 2018/0150831 A1    May 31, 2018

(51) Int. Cl.
```
G06Q 20/36    (2012.01)
G06T 11/60    (2006.01)
G06F 3/01     (2006.01)
```
(52) U.S. Cl.
CPC ........... *G06Q 20/367* (2013.01); *G06F 3/011* (2013.01); *G06T 11/60* (2013.01)

(58) Field of Classification Search
CPC .......................... G06Q 20/36; G06Q 20/40145
USPC ......................................................... 705/41
See application file for complete search history.

(56) References Cited

U.S. PATENT DOCUMENTS

| | | | |
|---|---|---|---|
| 5,999,944 A | 12/1999 | Lipkin | |
| 6,408,257 B1 | 6/2002 | Harrington et al. | |
| 6,602,075 B2 | 8/2003 | Adams | |
| 6,602,076 B2 | 8/2003 | Adams | |
| 6,625,299 B1 | 9/2003 | Meisner et al. | |
| 6,871,140 B1 | 3/2005 | Florance et al. | |
| 6,941,001 B1 | 9/2005 | Bolle et al. | |
| 7,099,850 B1 | 8/2006 | Mann, II et al. | |
| 7,392,208 B2 | 6/2008 | Morse et al. | |
| 7,680,694 B2 | 3/2010 | Glazer et al. | |
| 7,817,104 B2 | 10/2010 | Ryu et al. | |

(Continued)

FOREIGN PATENT DOCUMENTS

CN            103635920 A       3/2014

OTHER PUBLICATIONS

STIC Search (Year: 2020).*

(Continued)

*Primary Examiner* — Bennett M Sigmond
*Assistant Examiner* — Michael D Cranford
(74) *Attorney, Agent, or Firm* — Michael A. Springs

(57) ABSTRACT

An augmented reality system includes an augmented reality user device and a digital wallet. The digital wallet includes items associated with a user. The augmented reality user device includes a head mounted display, a memory, and processors. The display overlays virtual objects onto a field of view of the user. The processors overlay the digital wallet contents on a field of view of the user so that the user may select one of the items for use in an electronic transaction. For example, the processors request and receive an inventory of the digital wallet and overlay a graphical representation of the items within the field of view of the user via the display. The processors detect a hand gesture and identify a selected item based on the hand gesture. The processors generate a transfer token based on the identified item and transmit it to the electronic transaction terminal.

17 Claims, 4 Drawing Sheets

(56) References Cited

U.S. PATENT DOCUMENTS

| | | |
|---|---|---|
| 7,831,471 B2 | 11/2010 | Adams |
| 7,834,883 B2 | 11/2010 | Adams |
| 8,069,095 B2 | 11/2011 | Glazer et al. |
| 8,165,924 B2 | 4/2012 | Smyers et al. |
| 8,285,638 B2 | 10/2012 | Jung et al. |
| 8,326,704 B2 | 12/2012 | Glazer et al. |
| 8,396,738 B1 | 3/2013 | Allan et al. |
| 8,417,625 B2 | 4/2013 | Bannerjee et al. |
| 8,433,650 B1 | 4/2013 | Thomas |
| 8,438,001 B2 | 5/2013 | Natarajan et al. |
| 8,438,110 B2 | 5/2013 | Calman et al. |
| 8,442,295 B2 | 5/2013 | Sam |
| 8,442,906 B1 | 5/2013 | Thomas |
| 8,451,266 B2 | 5/2013 | Hertenstein |
| 8,577,803 B2 | 11/2013 | Chatterjee et al. |
| 8,589,255 B2 | 11/2013 | Glazer et al. |
| 8,601,386 B2 | 12/2013 | Altberg et al. |
| 8,611,601 B2 | 12/2013 | Calman et al. |
| 8,612,363 B2 | 12/2013 | Karkanias et al. |
| 8,635,104 B2 | 1/2014 | Adams |
| 8,660,951 B2 | 2/2014 | Calman et al. |
| 8,688,594 B2 | 4/2014 | Thomas et al. |
| 8,718,612 B2 | 5/2014 | Calman et al. |
| 8,743,145 B1 | 6/2014 | Price |
| 8,803,916 B1 | 8/2014 | Paczkowski et al. |
| 8,805,739 B2 | 8/2014 | Brown et al. |
| 8,810,599 B1 | 8/2014 | Tseng |
| 8,890,896 B1 | 11/2014 | Tseng |
| 8,929,591 B2 | 1/2015 | Calman et al. |
| 8,990,914 B2 | 3/2015 | Da Cruz Pinto et al. |
| 9,007,473 B1 | 4/2015 | Worley, III et al. |
| 9,026,486 B2 | 5/2015 | Doorhy et al. |
| 9,044,673 B1 | 6/2015 | Ahuja et al. |
| 9,047,636 B2 | 6/2015 | Ross |
| 9,066,200 B1 | 6/2015 | Loxam et al. |
| 9,082,149 B2 | 7/2015 | Argue et al. |
| 9,092,600 B2 | 7/2015 | Scavezze et al. |
| 9,092,898 B1 | 7/2015 | Fraccaroli et al. |
| 9,100,493 B1 | 8/2015 | Zhou et al. |
| 9,105,013 B2 | 8/2015 | Chavez |
| 9,111,383 B2 | 8/2015 | Fein et al. |
| 9,153,074 B2 | 10/2015 | Zhou et al. |
| 9,223,950 B2 | 12/2015 | Li et al. |
| 9,230,367 B2 | 1/2016 | Stroila |
| 9,251,504 B2 | 2/2016 | Chavez |
| 9,317,860 B2 | 4/2016 | Calman et al. |
| 9,331,969 B2 | 5/2016 | Barak et al. |
| 9,338,589 B2 | 5/2016 | Loxam et al. |
| 9,342,928 B2 | 5/2016 | Rasane et al. |
| 9,349,118 B2 | 5/2016 | Chavez |
| 9,355,123 B2 | 5/2016 | Wnuk et al. |
| 9,367,878 B2 | 6/2016 | Rao |
| 2002/0044152 A1 | 4/2002 | Abbott, III et al. |
| 2010/0238161 A1 | 9/2010 | Varga et al. |
| 2011/0134108 A1 | 6/2011 | Hertenstein |
| 2012/0156668 A1 | 6/2012 | Zelin |
| 2012/0232966 A1 | 9/2012 | Calman et al. |
| 2012/0232968 A1 | 9/2012 | Calman et al. |
| 2012/0232976 A1 | 9/2012 | Gelman et al. |
| 2012/0232977 A1 | 9/2012 | Calman et al. |
| 2012/0310826 A1 | 12/2012 | Chatterjee |
| 2013/0166332 A1 | 6/2013 | Hammad |
| 2013/0226682 A1 | 8/2013 | Grossman |
| 2014/0040127 A1 | 2/2014 | Chatterjee et al. |
| 2014/0067712 A1 | 3/2014 | Prasad et al. |
| 2014/0100994 A1 | 4/2014 | Tatzel et al. |
| 2014/0172559 A1 | 6/2014 | Calman et al. |
| 2014/0181678 A1 | 6/2014 | Louchheim et al. |
| 2014/0279426 A1 | 9/2014 | Holman et al. |
| 2014/0330511 A1 | 11/2014 | Tison et al. |
| 2014/0337175 A1 | 11/2014 | Katzin et al. |
| 2014/0379468 A1 | 12/2014 | Ganesh et al. |
| 2015/0012426 A1* | 1/2015 | Purves .............. G06Q 20/386 705/41 |
| 2015/0046284 A1* | 2/2015 | Hart .............. G06Q 30/0643 705/26.8 |
| 2015/0058229 A1 | 2/2015 | Wiacek et al. |
| 2015/0066722 A1 | 3/2015 | Calman et al. |
| 2015/0073907 A1 | 3/2015 | Purves et al. |
| 2015/0082203 A1 | 3/2015 | James et al. |
| 2015/0154446 A1 | 6/2015 | Masood et al. |
| 2015/0186984 A1 | 7/2015 | Loganathan |
| 2015/0206218 A1 | 7/2015 | Banerjee et al. |
| 2015/0221151 A1 | 8/2015 | Bacco et al. |
| 2015/0229750 A1 | 8/2015 | Zhou et al. |
| 2015/0254510 A1 | 9/2015 | McKinnon et al. |
| 2015/0294322 A1 | 10/2015 | Grigg et al. |
| 2015/0302027 A1 | 10/2015 | Wnuk et al. |
| 2015/0324562 A1 | 11/2015 | Scavezze et al. |
| 2015/0339468 A1 | 11/2015 | Son et al. |
| 2015/0348329 A1 | 12/2015 | Carre et al. |
| 2015/0363761 A1 | 12/2015 | Grigg et al. |
| 2015/0363764 A1 | 12/2015 | Grigg et al. |
| 2016/0049095 A1 | 2/2016 | Yannier et al. |
| 2016/0063484 A1 | 3/2016 | Carpenter et al. |
| 2016/0063517 A1 | 3/2016 | Sorensen |
| 2016/0078449 A1 | 3/2016 | Banerjee |
| 2016/0098936 A1 | 4/2016 | Solomon |
| 2016/0171767 A1 | 6/2016 | Anderson |
| 2016/0188861 A1 | 6/2016 | Todeschini |
| 2016/0189426 A1 | 6/2016 | Thomas et al. |
| 2016/0206960 A1 | 7/2016 | Allen et al. |
| 2016/0210784 A1 | 7/2016 | Ramsby et al. |
| 2016/0210790 A1 | 7/2016 | Rasane et al. |
| 2016/0217623 A1 | 7/2016 | Singh |
| 2016/0253651 A1* | 9/2016 | Park ................. G07F 9/023 705/39 |
| 2017/0262134 A1* | 9/2017 | Eriksson ............. G06F 3/017 |
| 2018/0032997 A1* | 2/2018 | Gordon .............. G06Q 30/0269 |

OTHER PUBLICATIONS

Saettler, M., "Westpac integrates augmented reality into bank account management," http://www.mobilecommercedaily.com/westpac-integrates-augmented-reality-into-bank-account-management, Aug. 6, 2014, 8 pages.

Dolan, H. et al., "Facilitating Digital Data Transfers Using Augmented Reality Display Devices," U.S. Appl. No. 15/353,005, filed Nov. 16, 2016, 50 pages.

Johansen, J. N. et al., "Real World Gamification Using Augmented Reality User Devices ," U.S. Appl. No. 15/377,690, filed Dec. 13, 2016, 70 pages.

Adams, A. J. et al., "Virtual Reality Dynamic Authentication," U.S. Appl. No. 15/367,590, filed Dec. 2, 2016, 58 pages.

Lee, J. et al., "Contextual Augmented Reality Overlays," U.S. Appl. No. 15/363,388, filed Nov. 29, 2016, 50 pages.

Waldron, W. H. et al., "Virtual Assessments Using Augmented Reality User Devices," U.S. Appl. No. 15/364,927, filed Nov. 30, 2016, 85 pages.

Votaw, E. S. et al., "Remote Document Execution and Network Transfer Using Augmented Reality Display Devices," U.S. Appl. No. 15/353,370, filed Nov. 16, 2016, 42 pages.

Johansen, J. N., "Facilitating Dynamic Across-Network Location Determination Using Augmented Reality Display Devices," U.S. Appl. No. 15/372,909, filed Dec. 8, 2016, 44 pages.

Ogrinz, M. et al., "Facilitating Network Security Analysis Using Virtual Reality Display Devices." U.S. Appl. No. 15/367,896, filed Dec. 2, 2016, 44 pages.

Dintenfass, K., "Property Assessments Using Augmented Reality User Devices," U.S. Appl. No. 15/367,435, filed Dec. 2, 2016, 81 pages.

Wadley, C. D. et al., "Facilitating Across-Network, Multi-User Sessions Using Augmented Reality Display Devices," U.S. Appl. No. 15/397,086, filed Jan. 3, 2017, 49 pages.

Dintenfass, K., "Geo-targeted Property Analysis Using Augmented Reality User Devices," U.S. Appl. No. 15/367,554, filed Dec. 2, 2016, 80 pages.

Adams, A. J. et al., "Augmented Reality Dynamic Authentication for Electronic Transactions," U.S. Appl. No. 15/367,551, filed Dec. 2, 2016, 57 pages.

(56) References Cited

OTHER PUBLICATIONS

Lee, J., "Facilitating Digital Data Transfers Using Virtual Reality Display Devices," U.S. Appl. No. 15/363,185, filed Nov. 29, 2016, 52 pages.
Dintenfass, K., "Real Estate Property Project Analysis Using Augmented Reality User Devices," U.S. Appl. No. 15/367,822, filed Dec. 2, 2016, 81 pages.
Adams, A. J. et al., "Augmented Reality Dynamic Authentication," U.S. Appl. No. 15/367,502, filed Dec. 2, 2016, 57 pages.
Waldron, W. H. et al., "Virtual Behavior Training Using Augmented Reality User Devices," U.S. Appl. No. 15/377,795, filed Dec. 13, 2016, 71 pages.
Dolan, H. et al., "User Authentication and Authorization for Electronic Transaction," U.S. Appl. No. 15/363,495, filed Nov. 29, 2016, 41 pages.
Waldron, W. H. et al., "Geolocation Notifications Using Augmented Reality User Devices," U.S. Appl. No. 15/365,272, filed Nov. 30, 2016, 85 pages.
Waldron, W. H. et al., "Object Recognition and Analysis Using Augmented Reality User Devices," U.S. Appl. No. 15/365,511, filed Nov. 30, 2016, 86 pages.
Wadley, C. D. et al., "Facilitating Across-Network Handoffs for Devices Using Augmented Reality Display Devices," U.S. Appl. No. 15/397,031, filed Jan. 3, 2017, 49 pages.
Wadley, C. D. et al., "Facilitating Across-Network Handoffs for an Assistant Using Augmented Reality Display Devices," U.S. Appl. No. 15/397,125, filed Jan. 3, 2017, 48 pages.
Johansen, J. N., "Facilitating Dynamic Across-Network Location Determination Using Augmented Reality Display Devices," U.S. Appl. No. 15/372,964, filed Dec. 8, 2016, 43 pages.

* cited by examiner

AUGMENTED REALITY HEADSET AND DIGITAL WALLET

TECHNICAL FIELD

The present disclosure relates generally to performing operations using an augmented reality display device that overlays graphic objects with objects in a real scene.

BACKGROUND

Securely transferring data and information across a network poses several technical challenges. Networks are susceptible to attacks by unauthorized users trying to gain access to sensitive information being communicated across the network. Unauthorized access to a network may compromise the security of the data and information being communicated across the network.

SUMMARY

In some embodiments, an augmented reality system includes an augmented reality user device and a digital wallet. The digital wallet includes a database of items associated with a user. The items may include a digital representation of a payment card. The augmented reality user device includes a head mounted display, a memory, and processors. The display overlays virtual objects onto a field of view of the user in real-time. The memory may store a digital wallet. The processors are able to overlay the contents of the digital wallet on a field of view of the user so that the user may select one of the items for use in an electronic transaction.

For example, the processors of the augmented reality user device are able to determine the augmented reality user device is proximate an electronic transaction terminal; request an inventory of the digital wallet; and receive the inventory of the digital wallet. The inventory includes items contained in the database of the digital wallet. The processors are able to overlay a graphical representation of the items contained in the digital wallet within the field of view of the user via the display. The user may perform a hand gesture selecting one of the displayed items for use in an electronic transaction. The processor can detect the hand gesture and identify the particular item selected based on the hand gesture. To perform the electronic transaction, the processor generates a transfer token based on the identified item. The transfer token includes information the user's account associated with the identified item. The processor transmits the transfer token to the electronic transaction terminal. The processor may transmit the transfer token using near field communication (NFC).

In particular embodiments, the digital wallet may be stored outside of the augmented reality user device. For example, the digital wallet may be stored in a mobile communications device or in cloud-based storage.

In particular embodiments, the augmented reality user device may perform authentication with the digital wallet. For example, the augmented reality user device may send an access request to the digital wallet that includes an identifier of the augmented reality user device. The digital wallet may grant access based on the identifier. The identifier may be based on biometric information, such as a facial scan or a retina scan, of the user.

In some embodiments, an electronic transaction terminal system includes a camera that captures an image of a person participating in an electronic transaction; a microphone that captures an audio signal of the person; and a database that includes records associating user accounts with an image and/or a voice print of the associated account holder. The user account may include a bank account, a payment card account, a digital wallet, or a blockchain, for example. The electronic transaction terminal system includes processors connected to the camera, microphone, and database to perform authentication and/or authorization of the user.

For example, the processors compare an image of the person participating in the electronic transaction, such as a facial scan, a retina scan, fingerprint, etc., with the records in the database. The processors identify a user account associated with the person by matching the image of the person with the image of the account holder in the database.

In particular embodiments, the processors may prompt the person to authorize the electronic transaction by speaking into the microphone. To authorize the particular transaction, the processors may capture an audio signal of the person speaking into the microphone; compare the captured audio signal with the voice print associated with the user account in the database; and upon determining the captured audio signal matches the voice print, authorize the electronic transaction to proceed using the user account.

In particular embodiments, the camera or microphone may be located in an augmented reality headset worn by the user participating in the electronic transaction. The database may be co-located with the electronic transaction terminal or located remotely, such as in cloud-based storage.

The embodiments described herein present several technical advantages. In one embodiment, an augmented reality user device overlays the contents of one or more digital wallets within a field of view of a user via a head mounted display. The user selects an item from the augmented reality display to use in performing an electronic transaction. An attacker is unable to observe or record the user entering authentication credentials to access the digital wallet because the augmented reality user device, not the user, accesses the digital wallet. Moreover, because the user selects a particular item from the wallet in an augmented reality environment, an attacker is unable to observe or record the item selected for use in the transaction. Thus, particular embodiments improve the security of an electronic transaction conducted over a network.

In some embodiments, an augmented reality user device may access more than one digital wallet associated with the user. The augmented reality user device overlays the contents of more than one digital wallet within a field of view of a user via a head mounted display, enabling the user to select an item from any of the displayed digital wallets. The augmented reality user device enables the user to authenticate themselves, which then enables the user to request the contents of multiple digital wallets with a single request and without having to provide different credentials to authenticate the user with each digital wallet.

The amount of processing resources used by the single request is significantly less than the amount of processing resources used to make multiple requests to multiple digital wallets. The overall performance of the augmented reality user device is improved as a result of consuming less processing resources, which may already be limited by the physical size of the augmented reality user device.

Another technical advantage is the augmented reality user device enhances the operation of certain digital wallets. For example, an electronic transaction terminal may support short range wireless communications which enable a user to wirelessly perform an electronic transaction. A user with a digital wallet stored in the cloud or on a remote network storage device, however, may not have the ability to wirelessly perform an electronic transaction. In particular embodiments, the augmented reality user device includes short range wireless communication capabilities. A user may access the cloud or remote network digital wallets using the augmented reality user device and use the short range wireless communication capabilities of the augmented reality user device to wirelessly perform an electronic transaction, thus enhancing the capabilities of certain digital wallets.

In one embodiment, an electronic transaction terminal system increases security of the network. For example, in conventional systems a user participating in an electronic transaction may self-authenticate, such as providing physical credentials and/or authentication codes to the electronic transaction terminal. The electronic transaction terminal may not be able to determine if the physical credentials and/or authentication codes are legitimate or if they were obtained fraudulently. In some embodiments, an electronic transaction terminal includes one or more of a camera, a microphone, a fingerprint reader, etc. The electronic transaction terminal may use information collected by these components to authenticate a user, without the need for the user to provide other credentials, which could be fraudulent. Thus, particular embodiments prevent some forms of fraudulent activity which increases the security of the network. Furthermore, the identity of the user participating in the electronic transaction may be compared against a database of known fraudsters, further increasing the security of the network.

As another advantage, particular embodiments of an electronic transaction terminal system may be particularly useful for providing network access to users with vision impairment or other handicaps preventing them from providing the physical credentials associated with conventional systems. For example, in some embodiments the electronic transaction terminal system may autonomously authenticate the user using one or more of the camera, microphone, fingerprint reader, etc., without requiring input from the vision impaired (or otherwise handicapped) user. Thus, the electronic transaction terminal system provides an improved user interface for accessing the network.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
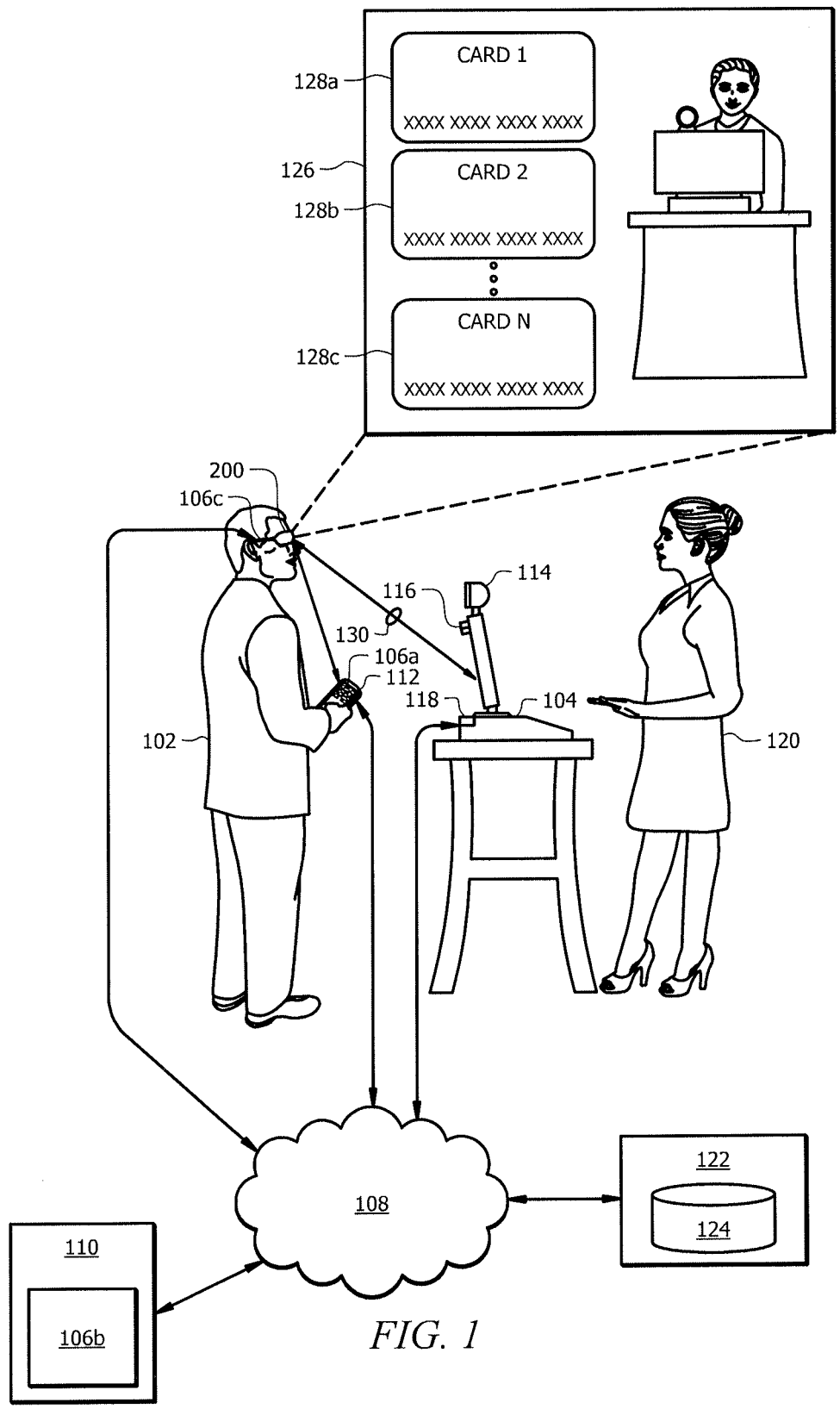
FIG. 1 is a schematic diagram of an embodiment of an augmented reality system configured to facilitate electronic transactions.

Securely performing electronic transactions across a data network poses several technical challenges. Networks are susceptible to attacks by unauthorized users trying to gain access to sensitive information being communicated across the network. Unauthorized access to a network may compromise the security of the data and information being communicated across the network.

A user may participate in an electronic transaction by sending sensitive account information across the network. The user may enter authentication information into an electronic transfer terminal or into a user device. Without the ability to authenticate a user, the system may be vulnerable to spoofing and other kinds of fraudulent activities. For example, a user entering authentication information in a public place may be susceptible to an attacker capturing the authentication information by direct observation or by recording. Particular embodiments provide an improved user interface to protect public entry of authentication information and securely perform electronic transactions across a network.

For example, in particular embodiments an augmented reality user device overlays the contents of one or more digital wallets within a field of view of a user via a display, such as a head-mounted display. The user selects an item from the augmented reality display to use in performing an electronic transaction. Because the augmented reality user device accesses the digital wallet (instead of the user accessing the digital wallet by entering credentials into, for example, a touchscreen of a mobile device), an attacker is unable to observe or record the user entering authentication credentials to access the digital wallet. Additionally, because the user selects a particular item from the wallet in an augmented reality environment, an attacker is unable to observe or record the item selected for use in the transaction. Thus, particular embodiments improve the security of an electronic transaction conducted over a network.

A user may store electronic resources, such as a digital wallet, in multiple databases in multiple locations accessible by a network. Using existing systems, when a user wants to access electronic resources from different databases with different sources, the user has to make individual authorization requests to each of the different sources in order to access the desired resources. For example, a user may not remember which digital wallet contains a particular item of interest. The user may access multiple digital wallets before finding the desired wallet.

The process of making multiple requests to access different data sources requires a significant amount of processing resources to generate the requests. Typically processing resources are limited and the system is unable to perform other tasks when processing resources are occupied which degrades the performance of the system.

The process of sending multiple access requests and receiving electronic resources from multiple sources occupies network resources until all of the electronic resources have been collected. This process poses a burden on the network which degrades the performance of the network. Thus, it is desirable to provide the ability to securely and efficiently request electronic resources from multiple data sources.

In some embodiments, an augmented reality user device may access more than one digital wallet associated with the user. The augmented reality user device overlays the contents of more than one digital wallet within a field of view of a user via a head mounted display, enabling the user to select an item from any of the displayed digital wallets. The augmented reality user device enables the user to authenticate themselves once, which then enables the user to request the contents of multiple digital wallets with a single request and without having to provide different credentials to authenticate the user with each digital wallet.

The amount of processing resources used by the single request is significantly less than the amount of processing resources used to make multiple requests to multiple digital wallets. The overall performance of the augmented reality user device is improved as a result of consuming less processing resources, which may already be limited by the physical size of the augmented reality user device.

Another technical advantage is that the augmented reality user device improves the operation of certain digital wallets. For example, an electronic transaction terminal may support short range wireless communications (e.g., near field communication (NFC), Bluetooth, WiFi, etc.) which enable a user to wirelessly perform an electronic transaction. A user with a digital wallet stored in the cloud or on a remote network storage device, however, may not have the ability to wirelessly perform an electronic transaction.

For example, a user physically located at the electronic transaction terminal may not have access to a digital wallet stored in the cloud or on a remote network. Even if the user could access the remote digital wallets while physically at the electronic transaction terminal, the remote digital wallets may not be capable of performing an electronic transaction using short range wireless communications.

In particular embodiments, the augmented reality user device may provide a user access to the remote digital wallets, and the augmented reality user device may include short range wireless communication capabilities. A user may access the cloud or remote network digital wallets using the augmented reality user device and use the short range wireless communication capabilities of the augmented reality user device to wirelessly perform an electronic transaction, thus enhancing the capabilities of certain digital wallets.

In existing systems where a user authenticates themselves, the user may enter authentication information into an electronic transfer terminal or into a user device. The entry of authentication information in a public place may be susceptible to an attacker capturing the authentication information by direct observation or by recording.

Furthermore, existing systems for electronic transactions are unable to identify and authenticate a user autonomously. Without the ability to authenticate a user, the system may be vulnerable to spoofing and other kinds of fraudulent activities. An attacker may pose as a legitimate user, but present fraudulent credentials.

Particular embodiments provide the ability to securely perform electronic transactions across a network. For example, in conventional systems a user participating in an electronic transaction may self-authenticate, such as providing physical credentials and/or authentication codes to the electronic transaction terminal. The electronic transaction terminal may not be able to determine if the physical credentials and/or authentication codes are legitimate or if they were obtained fraudulently.

In some embodiments, an improved electronic transaction terminal includes one or more of a camera, a microphone, a fingerprint reader, etc. The electronic transaction terminal may use information collected by these components to authenticate a user, without the need for the user to provide other credentials, which could be fraudulent or could be observed or recorded by an attacker. Thus, particular embodiments prevent some forms of fraudulent activity which increases the security of the network. Furthermore, the identity of the user participating in the electronic transaction may be compared against a database of known fraudsters, further increasing the security of the network.

As another advantage, particular embodiments of an electronic transaction terminal system may be particularly useful for providing network access to users with vision impairment or other handicaps preventing them from providing the physical credentials associated with conventional systems. For example, in some embodiments the electronic transaction terminal system may autonomously authenticate the user using one or more of the camera, microphone, fingerprint reader, etc., without requiring input from the vision impaired (or otherwise handicapped) user. Thus, the electronic transaction terminal system provides an improved user interface for accessing the network. An example system is illustrated in FIG. 1.

FIG. 1 is a schematic diagram of an embodiment of an augmented reality system 100 configured to facilitate electronic transactions. System 100 includes user 102 participating in an electronic transaction with electronic transaction terminal system 104. In particular embodiments, user 102 possesses one or more digital wallets 106 and user 102 is wearing augmented reality user device 200. In the illustrated example, augmented reality user device 200 is configured as a head-mounted wearable device. Other examples of wearable devices are integrated into an eyeglass structure, contact lenses or other eyewear structure, a visor structure, a helmet structure, or any other suitable vision-based display structure. In some embodiments, augmented reality user device 200 may be or may be integrated with a mobile user device, such as mobile device 112. Augmented reality user device 200 is described in more detail below.

Digital wallet 106 comprises a database of one or more items associated with user 102. For example, wallet 106 may include a digital representation of a payment card (e.g., credit card, debit card, etc.), a loyalty card, a gift card, a rewards card, driver's license, insurance card, transit pass, event ticket, boarding pass, etc. A digital representation of a payment card may include information such as bank account information, billing address, shipping address, credit card number, expiration date, security numbers, personal identification number, member number, reward points, account balance, etc.

One or more of the items may be used for an electronic transaction. For example, a credit card, a gift card, and a loyalty card may all be used for an electronic transaction, such as a purchase of goods or services.

Digital wallet 106 may comprise a control component (e.g., control software) and a data component (e.g., database of items). The control component may provide security and encryption for the data component and for external communications with other systems, such as electronic transaction systems, or other devices, such as augmented reality user device 200.

Digital wallet 106 is stored in memory of an electronic device. For example, system 100 may include cloud storage device 110. Digital wallet 106b is stored in cloud storage device 110. User 102 may possess mobile device 112, such as a mobile phone, a tablet computer, a laptop computer, etc. Digital wallet 106a is stored in mobile device 112. In some embodiments, augmented reality user device 200 may include digital wallet 106c.

Electronic transaction terminal 104 provides an interface for a user, such as user 102, to conduct an electronic transaction (e.g., purchase, sale, exchange, trade, auction, retail, wholesale, etc.) with another party or entity. Representative 120 may represent the other party or entity and may interact with electronic transaction terminal 104 on behalf of the other party or entity. Electronic transaction terminal 104 includes hardware and software to process an electronic transaction. For example, electronic transaction terminal 104 includes one or more processors implemented as one or more central processing unit (CPU) chips, logic units, cores (e.g. a multi-core processor), field-programmable gate array (FPGAs), application specific integrated circuits (ASICs), or digital signal processors (DSPs). The one or more processors are configured to implement various instructions to process an electronic transaction and may be implemented in hardware and/or software.

In some embodiments, electronic transaction terminal system 104 includes one or more of camera 114, microphone 116 and fingerprint reader 118. In some embodiments, electronic transaction terminal system 104 may include additional devices to scan or capture information, such as biometric information, associated with user 102.

Examples of camera 114 include, but are not limited to, charge-coupled device (CCD) cameras and complementary metal-oxide semiconductor (CMOS) cameras. Camera 114 is configured to capture images of people participating in an electronic transaction with electronic transaction terminal 104. Camera 114 may be configured to capture images continuously, at predetermined intervals, or on-demand. For example, camera 114 may be configured to receive a command from a user, such as representative 120, to capture an image. In another example, camera 114 is configured to continuously capture images as a video stream. Camera 114 may be communicably coupled to one or more processors and provide images to the one or more processors for performing, for example, facial recognition to identify people, such as user 102, in front of electronic transaction terminal 104.

Microphone 116 is configured to capture audio signals (e.g. voice signals or commands) from a user, such as user 102 or representative 120. Microphone 116 may be configured to capture audio signals continuously, at predetermined intervals, or on-demand. Microphone 116 is communicably coupled to one or more processors and provides captured audio signals to one or more processors for performing, for example, voice recognition to identify people, such as user 102, in front of electronic transaction terminal 104.

Fingerprint reader 118 is configured to capture a fingerprint from a user, such as user 102. Fingerprint reader 118 is communicably coupled to one or more processors and provides captured fingerprints to one or more processors for performing, for example, fingerprint recognition to identify people, such as user 102, in front of electronic transaction terminal 104. The operation of electronic transaction terminal system 104 is described in more detail below.

In some embodiments, system 100 includes institution 122. Examples of institutions include, but are not limited to, organizations, businesses, government agencies, financial institutions, universities, etc. Institution 122 includes database 124.

Database 124 includes information about users associated with institution 122, such as user 102. Database 124 includes one or more of account information (e.g., user identifier, alias, account number, account type, routing number, account balance, billing address, shipping address, email address, phone number, expiration date, member number, etc.), security information (security number, personal identification number, biometric information, etc.), or any other information associated with a user, such as user 102. In some embodiments, the biometric information included in database 124 may include images, voiceprints, and/or fingerprints associated with a user.

In some embodiments, system 100 includes network 108. Network 108 comprises a plurality of network nodes configured to communicate data between one or more of augmented reality user device 200, electronic transaction terminal system 104, cloud storage 110, institution 122, and mobile device 112. In particular embodiments, not all components are configured to communicate to every other component. For example, in some embodiments mobile device 112 may communicate with cloud storage 110 or augmented reality user device 200, but not with institution 122.

Examples of network nodes include, but are not limited to, routers, switches, modems, web clients, and web servers. Network 108 comprises any suitable type of wireless and/or wired network including, but not limited to, all or a portion of the Internet, the public switched telephone network, a cellular network, and/or a satellite network. Network 108 is configured to support any suitable communication protocols as would be appreciated by one of ordinary skill in the art upon viewing this disclosure.

Augmented reality user device 200 is configured to overlay virtual objects onto a field of view of user 102 in real-time via a head mounted display. In some embodiments, augmented reality user device 200 overlays the contents of one or more digital wallets 106 as virtual objects within a field of view of user 102. User 102 may select one of the virtual objects to use in performing an electronic transaction with electronic transaction terminal 104.

For example, user 102 may approach electronic transaction terminal 104 to participate in an electronic transaction, such as making a credit card purchase. Augmented reality user device 200 may autonomously determine that user 102 is proximate electronic transaction terminal 104 (e.g., via GPS, via wireless communication with electronic transaction terminal 104, or via any other suitable proximity detection system), or may receive an input from user 102 (e.g., gesture, graphical user interface selection, etc.) indicating that user 102 would like to view the contents of a digital wallet, such as digital wallet 106.

Augmented reality user device 200 may access one or more digital wallets 106 known to user 102 and display the contents of digital wallets 106 as virtual objects onto a field of view of user 102. An example of an augmented display seen by user 102 is illustrated as augmented display 126.

Augmented display 126 comprises virtual objects, such as cards 128 overlaid onto the field of view of user 102. In the illustrated example, the field of view of user 102 includes representative 120 and electronic transfer terminal 104. Cards 128 are overlaid onto the view of representative 120 and electronic transfer terminal 104.

Cards 128 may comprise graphical representations of one or more items contained in digital wallet 106. For example, card 128a may comprise a graphical representation of a credit card, card 128b may comprise a graphical representation of a debit card, and card 128c may comprise a graphical representation of a gift card. In other embodiments, card 128 may comprise a graphical representation of any one of a payment card (e.g., credit card, debit card, etc.), a loyalty card, a gift card, a rewards card, a driver's license, an insurance card, a transit pass, an event ticket, boarding pass, etc.

User 102 may select one or more of cards 128 for use in an electronic transaction, such as a credit card purchase, with electronic transaction terminal 104. In some embodiments, user 102 may select one or more of cards 128 by performing a hand gesture that augmented reality user device 200 may detect and use to identify the selected card 128. In some embodiments, user 102 may select one or more of cards 128 by looking in the direction of card 128, by selecting card 128 via a menu, or any other suitable user interface for selecting card 128. For example, user 102 may reach out with a hand and perform a grabbing gesture, dragging gesture, or any other suitable gesture on card 128. Augmented reality user device 200 may detect the gesture and identify a particular card 128, such as card 128a, which is associated with a digital representation of a credit card stored in digital wallet 106. Augmented reality user device 200 may use the identified credit card from digital wallet 106 to generate transfer token 130.

Transfer token 130 comprises information about a user account used to perform the electronic transaction. Augmented reality user device 200 generates transfer token 130 and sends transfer token 130 to electronic transaction terminal 104 to perform an electronic transaction between user 102 and electronic transaction terminal 104. Transfer token 130 may comprise any suitable information for executing an electronic transaction. For example, transfer token 130 may comprise information identifying a user, an account for the user (e.g., account number, one-time-use code, etc.), a resource to be transferred between the user and the identified person (e.g., currency, reward points, etc.), an amount of the resource to be transferred (e.g., purchase price), a transaction identifier and/or any other suitable information.

In some embodiments, augmented reality user device 200 may encrypt transfer token 130 before sending transfer token 130 to electronic transaction terminal 104. In particular embodiments, token 130 may include information and encryption specified by a standard, such as the EMV standard for payment terminals and automated teller machines.

For example, augmented reality user device 200 may generate transfer token 130 based on account information associated with selected card 128a. Transfer token 130 may comprise the name of user 102, a one-time-use code representing the credit card account associated with card 128a, an amount of money to charge to the credit card, transaction identifier identifying the particular transaction, and/or any other suitable information. Augmented reality user device 200 may encrypt transfer token 130 and send transfer token 130 to electronic transaction terminal 104 to make a credit card purchase with the credit card associated with card 128a. Electronic transaction terminal 104 receives token 130, extracts the information from token 130, and completes the transaction. An example of an electronic transaction is described in more detail with respect to FIG. 3.

In some embodiments, augmented reality user device 200 may not generate a transfer token. Augmented reality user device 200 may inform digital wallet 106 that user 102 selected card 128a. Digital wallet 106 may perform the electronic transaction with electronic transaction terminal 104 using the card identified by card 128a.

System 100 includes particular technical advantages. For example, because augmented reality user device 200 accesses digital wallet 106 (instead of user 102 accessing digital wallet by entering credentials into a touchscreen of mobile device 112), an attacker is unable to observe or record user 102 entering authentication credentials to access digital wallet 106. Additionally, because user 102 selects a particular card 128 in an augmented reality environment, an attacker is unable to observe or record the particular card 128 selected for use in the electronic transaction. Thus, particular embodiments improve the security of an electronic transaction conducted over a network.

Another technical advantage is that the augmented reality user device improves the operation of certain digital wallets. For example, electronic transaction terminal 104 may support short range wireless communications (e.g., near field communication (NFC), Bluetooth, WiFi, etc.). User 102 may not have the ability to wirelessly perform the electronic transaction with digital wallet 106b stored in cloud storage device 110. Augmented reality user device 200, however, may be able to perform a wireless transaction with electronic transaction terminal 104 and augmented reality user device 200 has access to digital wallet 106b. Accordingly, user 102 may perform a wireless electronic transaction using augmented reality user device 200 and a card 128 stored in digital wallet 106b, thus enhancing the capabilities of digital wallet 106b.

In some embodiments, user 102 may not be wearing augmented reality user device 200, may have not have access digital wallets 106, and may not be carrying physical payment cards. An advantage of particular embodiments is that user 102 may still perform an electronic transaction with electronic transaction terminal 104.

In particular embodiments, electronic transaction terminal 104 may capture an image of user 102 using camera 114. Electronic transaction terminal 104 may compare the image of user 102 with the one or more records in the database 124 of institution 122.

In particular embodiments, institution 122 may comprise a bank where user 102 maintains an account. In some embodiments, institution 122 may comprise a retailer associated with electronic transaction terminal 104.

Electronic transaction terminal 104 identifies one or more accounts associated with user 102, for example, by matching the captured image of user 102 with an image of the account holder associated with the one or more accounts of user 102. In some embodiments, electronic transaction terminal 104 may capture and match a fingerprint or any other suitable biometric information associated with user 102. Thus, electronic transaction terminal 104 has identified at least one account associated with user 102 that user 102 may use to complete the electronic transaction.

In some embodiments, electronic transaction terminal 104 may request further verification before completing the electronic transaction. For example, to authorize the particular electronic transaction, electronic transaction terminal 104 may prompt user 102 to speak into microphone 116. For example, electronic transaction terminal 104 may display a message, turn on a light, etc. to prompt user 102 to authorize the transaction. In some embodiments, representative 120 may ask user 102 to verbally authorize the electronic transaction.

Electronic transaction terminal 104 may capture an audio signal of user 102 speaking into microphone 118. In some embodiments, electronic transaction terminal 104 may compare the captured audio signal with a voice print associated with user 102 stored in database 124. Upon determining the captured audio signal matches a voice print associated with the one or more accounts of user 102, electronic transaction terminal 104 may authorize the electronic transaction to proceed using one or more of the user accounts of user 102.

In some embodiments, electronic transaction terminal 104 may authenticate and authorize a user using any of the above described methods even when user 102 uses a physical or digital payment card for the electronic transaction. The extra layer of verification may detect an attacker attempting to use a fraudulent payment card, for example, if an image of the person presenting the payment card does not match an image in database 124.

Another particular advantage of system 100 is that existing systems for electronic transactions are unable to identify and authenticate a user autonomously. Without the ability to authenticate a user, the conventional system may be vulnerable to spoofing and other kinds of fraudulent activities. Particular embodiments of electronic transaction terminal 104 provide the ability to securely perform electronic transactions across a network. For example, electronic transaction terminal 104 may autonomously authenticate user 102, without user 102 providing credentials that could be fraudulent or could be observed or recorded by an attacker. Thus, particular embodiments prevent some forms of fraudulent activity which increases the security of the network. Furthermore, the identity of the user participating in the electronic transaction may be compared against a database of known fraudsters, further increasing the security of the network.

As another advantage, particular embodiments of an electronic transaction terminal system may be particularly useful for providing network access to users with vision impairment or other handicaps preventing them from providing the physical credentials associated with conventional systems. For example, in some embodiments electronic transaction terminal 104 may autonomously authenticate user 102 using one or more of camera 114, microphone 166, fingerprint reader 118, etc., without requiring input from the vision impaired (or otherwise handicapped) user. Thus, electronic transaction terminal 104 provides an improved user interface for accessing the network.

Figure 2:
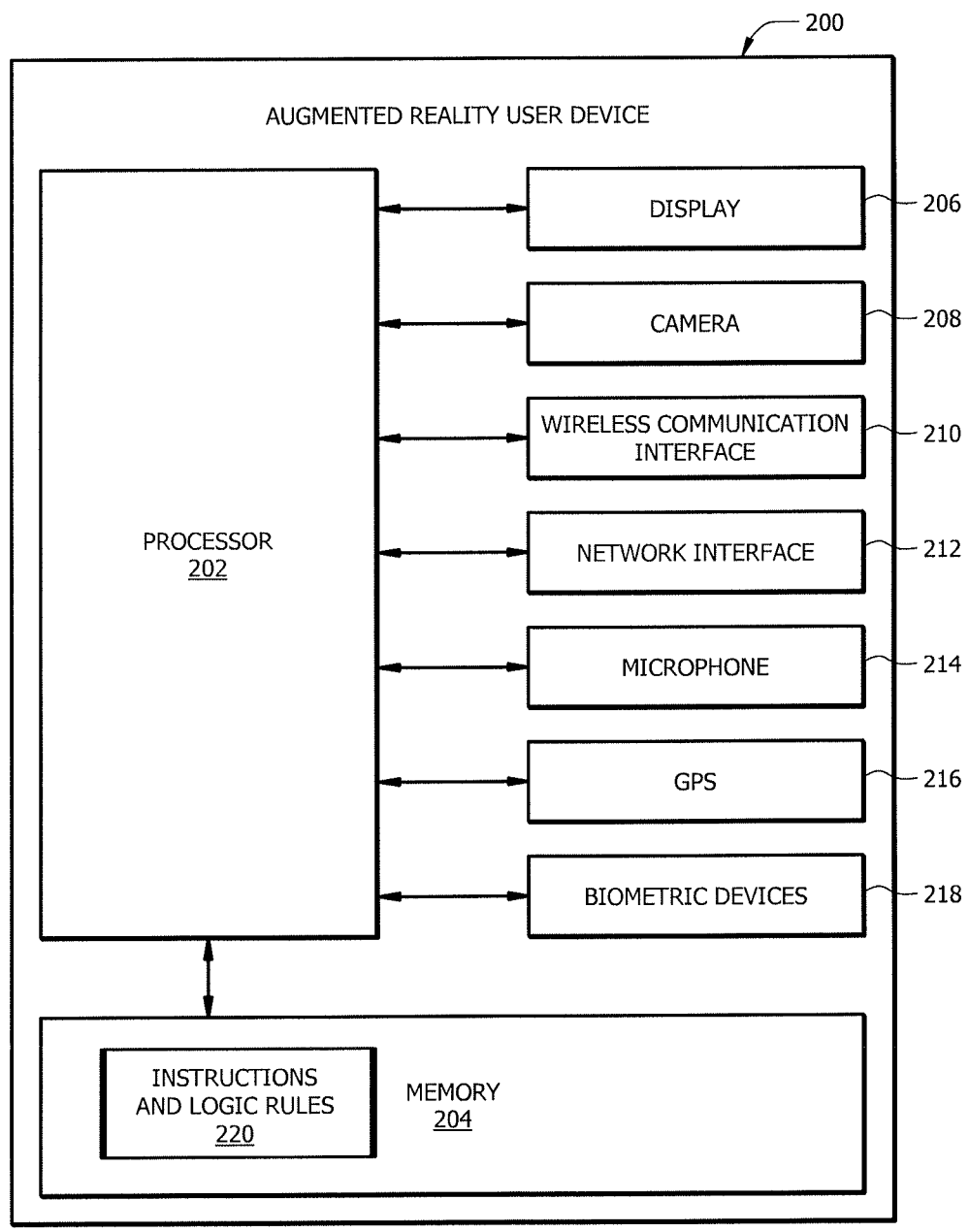
FIG. 2 is a schematic diagram of an embodiment of an augmented reality user device employed by the augmented reality system.

FIG. 2 is a schematic diagram of an embodiment of an augmented reality user device employed by the augmented reality system. Augmented reality user device 200 may be configured to overlay the contents of digital wallet 106 within a field of view of user 102, capture biometric information of user 102 wearing augmented reality user device 200, and to facilitate an electronic transaction with electronic transaction terminal 104. Examples of augmented reality user device 200 in operation are described in FIGS. 3 and 4.

Augmented reality user device 200 comprises a one or more processors 202, a memory 204, and a display 206. Particular embodiments may include a camera 208, a wireless communication interface 210, a network interface 212, a microphone 214, a global position system (GPS) sensor 216, and/or one or more biometric devices 218. Augmented reality user device 200 may be configured as shown or in any other suitable configuration. For example, augmented reality user device 200 may comprise one or more additional components and/or one or more shown components may be omitted.

Processor 202 comprises one or more CPU chips, logic units, cores (e.g., a multi-core processor), FPGAs, ASICs, or DSPs. Processor 202 is communicatively coupled to and in signal communication with memory 204, display 206, camera 208, wireless communication interface 210, network interface 212, microphone 214, GPS sensor 216, and biometric devices 218. Processor 302 is configured to receive and transmit electrical signals among one or more of memory 204, display 206, camera 208, wireless communication interface 210, network interface 212, microphone 214, GPS sensor 216, and biometric devices 218. The electrical signals are used to send and receive data (e.g., images captured from camera 208, virtual objects to display on display 206, etc.) and/or to control or communicate with other devices. For example, processor 202 transmits electrical signals to operate camera 208. Processor 202 may be operably coupled to one or more other devices (not shown).

Processor 202 is configured to process data and may be implemented in hardware or software. Processor 202 is configured to implement various instructions and logic rules, such as instructions and logic rules 220. For example, processor 202 is configured to display virtual objects on display 206, detect hand gestures, identify virtual objects selected by a detected hand gesture (e.g., identify selected card 128*a*), generate a transfer token (e.g., transfer token 130), capture biometric information of a user, such as user 102, via one or more of camera 208, microphone 214, and/or biometric devices 218, and communicate via wireless communication interface 210 with digital wallet 106 and/or electronic transmission terminal 104 (e.g., send transfer token 130 or biometric information to electronic transaction terminal 104, request contents of digital wallet 106). In an embodiment, the functions of processor 202 may be implemented using logic units, FPGAs, ASICs, DSPs, or any other suitable hardware.

Memory 204 comprises one or more disks, tape drives, or solid-state drives, and may be used as an over-flow data storage device, to store programs when such programs are selected for execution, and to store instructions and data that are read during program execution, such as instructions and logic rules 220. Memory 204 may be volatile or non-volatile and may comprise ROM, RAM, TCAM, DRAM, and SRAM. Memory 204 is operable to store, for example, digital wallet 106, transfer tokens 130, instructions for performing the functions of augmented reality user device 200 described herein, and any other data or instructions.

Display 206 is configured to present visual information to a user in an augmented reality environment that overlays virtual or graphical objects onto tangible objects in a real scene in real-time. In an embodiment, display 206 is a wearable optical display configured to reflect projected images and enables a user to see through the display. For example, display 206 may comprise display units, lens, semi-transparent mirrors embedded in an eye glass structure, a visor structure, or a helmet structure. Examples of display units include, but are not limited to, a cathode ray tube (CRT) display, a liquid crystal display (LCD), a liquid crystal on silicon (LCOS) display, a light emitting diode (LED) display, an active matrix OLED (AMOLED), an organic LED (OLED) display, a projector display, or any other suitable type of display as would be appreciated by one of ordinary skill in the art upon viewing this disclosure. In another embodiment, display 206 is a graphical display on a user device. For example, the graphical display may be the display of a tablet or smart phone configured to display an augmented reality environment with virtual or graphical objects overlaid onto tangible objects in a real scene in real-time.

Examples of camera 208 include, but are not limited to, charge-coupled device (CCD) cameras and complementary metal-oxide semiconductor (CMOS) cameras. Camera 208 is configured to capture images of a wearer of augmented reality user device 200, such as user 102. Camera 208 may be configured to capture images continuously, at predetermined intervals, or on-demand. For example, camera 208 may be configured to receive a command from user 102 to capture an image. In another example, camera 208 is configured to continuously capture images to form a video stream. Camera 208 is communicably coupled to processor 202.

Examples of wireless communication interface 210 include, but are not limited to, a Bluetooth interface, an RFID interface, an NFC interface, a local area network (LAN) interface, a personal area network (PAN) interface, a wide area network (WAN) interface, a Wi-Fi interface, a ZigBee interface, or any other suitable wireless communication interface as would be appreciated by one of ordinary skill in the art upon viewing this disclosure. Wireless communication interface 210 is configured to facilitate processor 202 to communicating with other devices. For example, wireless communication interface 210 is configured to enable processor 202 to send and receive signals with other devices, such as mobile device 112 or electronic transaction terminal 104. Wireless communication interface 210 is configured to employ any suitable communication protocol.

Network interface 212 is configured to enable wired and/or wireless communications and to communicate data through a network, system, and/or domain. For example, network interface 212 is configured for communication with a modem, a switch, a router, a bridge, a server, or a client. Processor 202 is configured to receive data using network interface 212 from a network or a remote source, such as cloud storage device 110, institution 122, mobile device 112, etc.

Microphone 214 is configured to capture audio signals (e.g. voice signals or commands) from a user, such as user 102. Microphone 214 is configured to capture audio signals continuously, at predetermined intervals, or on-demand. Microphone 214 is communicably coupled to processor 202.

GPS sensor 216 is configured to capture and to provide geographical location information. For example, GPS sensor 216 is configured to provide a geographic location of a user, such as user 102, employing augmented reality user device 200. GPS sensor 216 may be configured to provide the geographic location information as a relative geographic location or an absolute geographic location. GPS sensor 216 may provide the geographic location information using geographic coordinates (i.e., longitude and latitude) or any other suitable coordinate system. GPS sensor 216 is communicably coupled to processor 202.

Examples of biometric devices 218 include, but are not limited to, retina scanners and fingerprint scanners. Biometric devices 218 are configured to capture information about a person's physical characteristics and to output a biometric signal based on captured information. A biometric signal is a signal that is uniquely linked to a person based on their physical characteristics. For example, biometric device 218 may be configured to perform a retinal scan of the user's eye and to generate a biometric signal for the user based on the retinal scan. As another example, a biometric device 218 is configured to perform a fingerprint scan of the user's finger and to generate a biometric signal for the user based on the fingerprint scan. Biometric device 218 is communicably coupled to processor 202.

Figure 3:
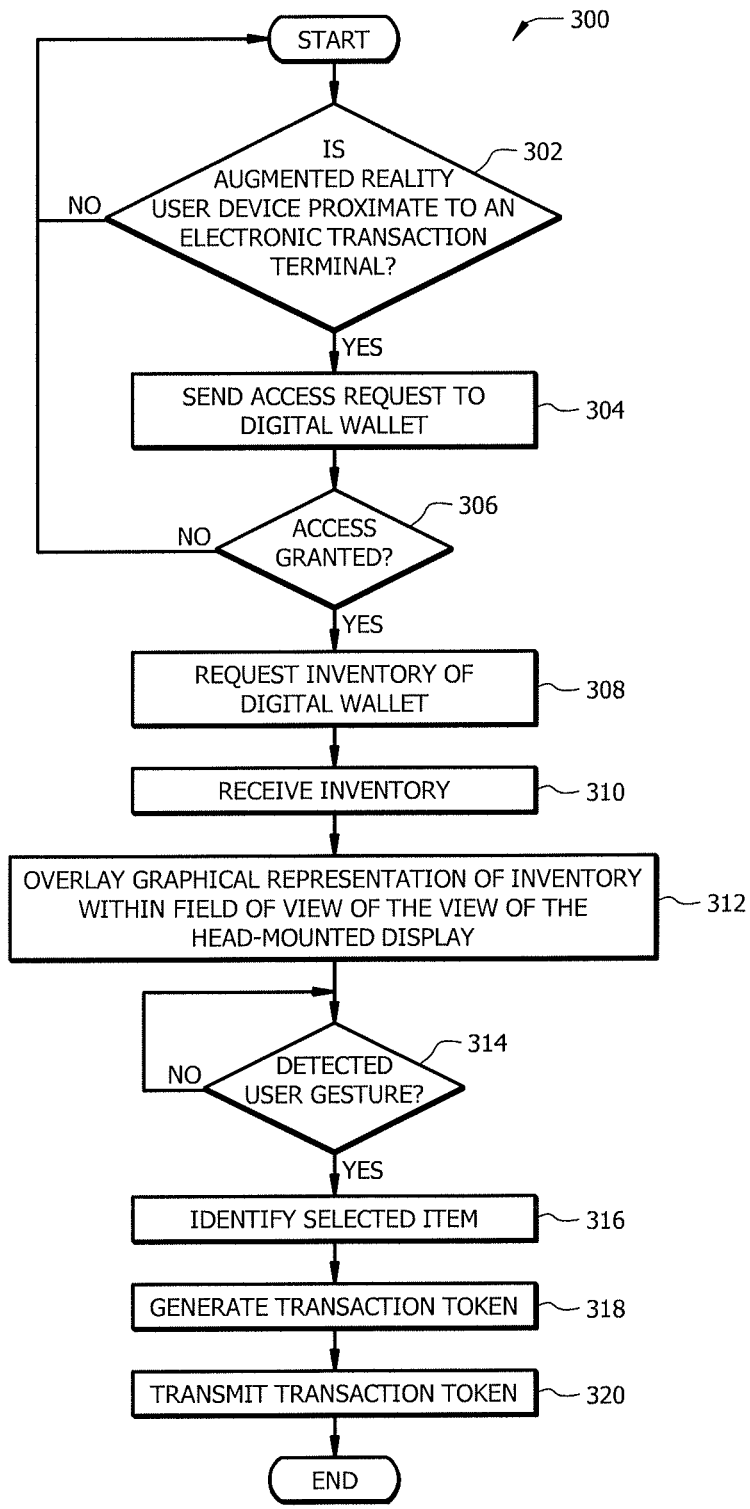
FIG. 3 is a flowchart of an embodiment of a method of overlaying the contents of a digital wallet on an augmented reality display.
Figure 4:
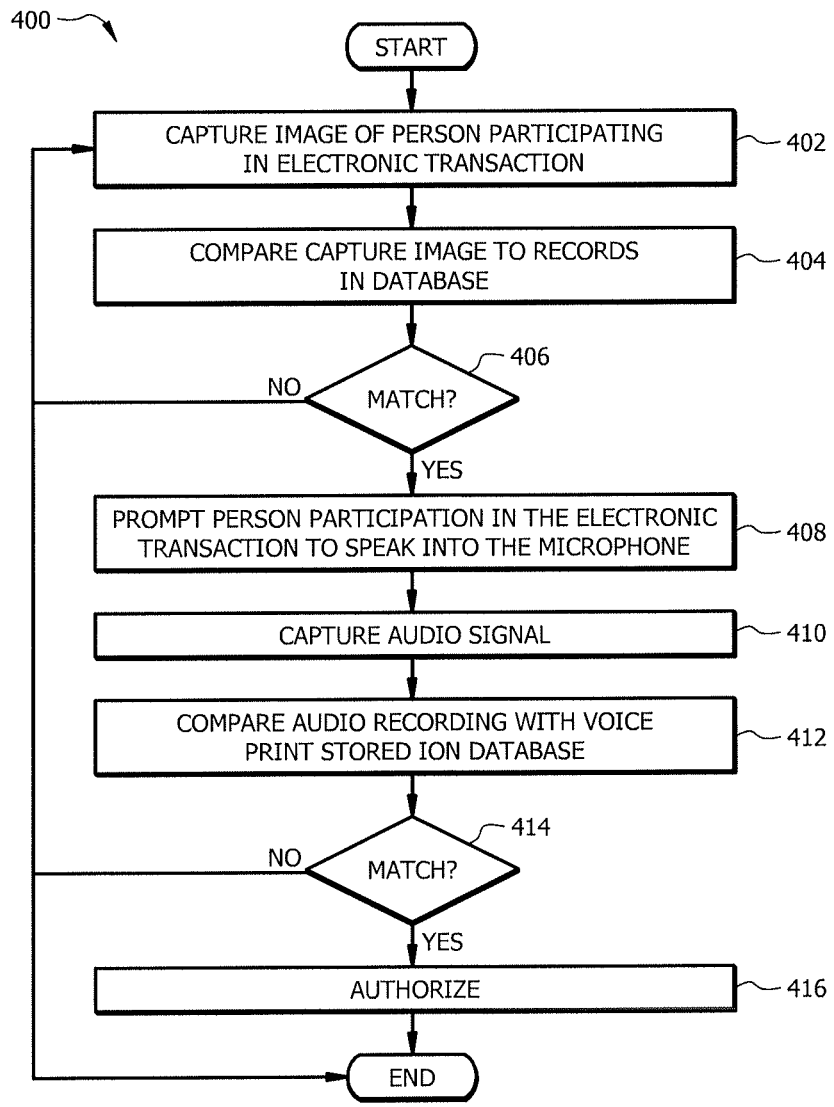
FIG. 4 is a flowchart of an embodiment of a method of authenticating and authorizing an electronic transaction.

An example method performed by augmented reality user device 200 is illustrated in FIG. 3. An example method performed by electronic transaction terminal 104 is illustrated in FIG. 4.

FIG. 3 is a flowchart of an embodiment of a method of overlaying the contents of a digital wallet on an augmented reality display. Method 300 may be performed by any of the components described with respect to FIGS. 1 and 2.

Method 300 begins at step 302, where an augmented reality user device determines whether the augmented reality user device is proximate an electronic transmission terminal. For example, augmented reality user device 200 may determine it is proximate electronic transmission terminal 104.

In some embodiments, augmented reality user device 200 may autonomously determine it is proximate electronic transaction terminal 104 (e.g., via GPS, via wireless communication with electronic transaction terminal 104, or via any other suitable proximity detection system). In some embodiments, augmented reality user device 200 may receive an input from user 102 wearing augmented reality user device 200 (e.g., gesture, graphical user interface selection, etc.) indicating that user 102 is proximate an electronic transaction terminal 104.

If the augmented reality user device determines that it is not proximate an electronic transmission terminal, then the method returns to the start. Otherwise, if augmented reality user device 200 is proximate electronic transaction terminal 104, user 102 may want to view the contents of one or more digital wallets so that user 102 may perform an electronic transaction with an item in one of the digital wallets and the method continues to step 304.

At step 304, the augmented reality user device requests an inventory of a digital wallet. For example, augmented reality user device 200 may request an inventory of one or more of digital wallets 106a, 106b, and/or 106c.

In some embodiments, the augmented reality user device performs authentication to access the digital wallets. In some embodiments, the digital wallet may grant access based on an identifier of the augmented reality user device. For example, augmented reality user device 200 may include a unique identifier, such as a MAC address or any suitable alphanumeric identifier uniquely identifying augmented reality user device 200.

In some embodiments, the identifier may be determined based on biometric information of the user wearing the augmented reality user device. For example, augmented reality user device 200 may verify the identity of user 102 wearing augmented reality user device 200 via biometric information captured from one or more of camera 208, microphone 214, or biometric devices 218. Augmented reality user device 200 may generate an identifier based on the identity of user 102.

In some embodiments, the augmented reality user device sends an access request to the digital wallet, the access request including an identifier of the augmented reality user device. For example, augmented reality user device 200 sends an access request to digital wallet 106b that includes an identifier of augmented reality user device 200. Digital wallet 106b may grant or deny access based on the identifier of the augmented reality user device.

In some embodiments, each digital wallet (e.g., 106a, 106b, and 106c) may have its own access credentials. The augmented reality user device may store the access credentials for one or more of the digital wallets in its memory. The augmented reality user device may verify the user wearing the augmented reality user device before granting access to the stored credentials. If the user is an authorized user, then the augmented reality user device may send the stored credentials to the digital wallet.

In some embodiments, the user may want to access multiple digital wallets at one time. In these embodiments, the augmented reality user device verifies the user once, and using the stored credentials, automatically sends multiple requests to each of the digital wallets.

A technical advantage of augmented reality user device 200 is that it enables user 102 to authenticate once and request the contents of multiple digital wallets 106 with a single request. User 102 does not have to enter or provide different credentials to authenticate with each digital wallet 106.

The amount of processing resources used by the single request is significantly less than the amount of processing resources used to make multiple requests to multiple digital wallets. The overall performance of augmented reality user device 200 is improved as a result of consuming less processing resources.

At step 306, the augmented reality user device determines whether it is granted access to the digital wallet. For example, augmented reality user device 200 determines whether it is granted access to digital wallet 106b based on the results of step 304. If augmented reality user device 200 is not granted access, then the method returns to the start (or repeats step 304, in some embodiments). If augmented reality user device 200 is granted access, then the method continues to step 308.

At step 308, the augmented reality user device requests an inventory of the digital wallet. For example, augmented reality user device 200 requests an inventory of digital wallet 106b. Augmented reality user device 200 may communicate with digital wallet 106b over network 108.

In some embodiments, the digital wallet (e.g., digital wallet 106c) may be stored in memory 204 of augmented reality user device 200. Augmented reality user device 200 may communicate with digital wallet 106c using any suitable method for accessing memory 204.

In some embodiments, the digital wallet (e.g., digital wallet 106a) may be stored in a wireless device (e.g., wireless device 112). Augmented reality user device 200 may communicate with digital wallet 106a using wireless communication interface 210.

At step 310, the augmented reality user device receives the inventory of the digital wallet. The inventory comprises one or more items contained in the database of the digital wallet. For example, augmented reality user device 200 may receive the inventory of digital wallet 106b. As a particular example, the inventory of digital wallet 106b may comprise one credit card, one debit card, and one reward card.

At step 312, the augmented reality user device overlays a graphical representation of the one or more items contained in the database of the digital wallet within the field of view of the user via the display. For example, augmented reality user device 200 overlays a graphical representation of the credit card (e.g., card 128a), the debit card (e.g., card 128b), and the reward card (e.g., card 128c) within the field of view of user 102 via display 206. User 102 sees augmented display 126.

At step 314, the augmented reality user device detects a hand gesture performed by the user. The hand gesture selects one of the one or more items displayed within the field of view of the user to be used for an electronic transaction with the electronic transaction terminal. For example, user 102 wants to use a credit card to perform an electronic transaction with electronic transaction terminal 104 so user 102 performs a grabbing gesture on card 128a.

If the augmented reality user device does not detect a hand gesture, then the augmented reality user device may repeat step 312 in some embodiments until a gesture is detected. In some embodiments, the augmented reality user device may automatically stop displaying the graphical representation of the digital wallet contents if a gesture is not detected within a particular threshold of time or if the user performs an action requesting the augmented reality user device to stop displaying the digital wallet contents. If the augmented reality user device does detect a hand gesture, then the method continues to step 316.

At step 316, the augmented reality user device identifies the selected one of the one or more items based on the detected hand gesture. For example, augmented reality user device 200 identifies card 128a.

At step 318, the augmented reality user device generates a transfer token based on the identified item. The transfer token comprises information about a user account associated with the identified item. For example, augmented reality user device 200 generates transfer token 130 based on information about the credit card associated with card 128a.

At step 320, the augmented reality user device transmits the transfer token to the electronic transaction terminal. For example, augmented reality user device 200 transmits transfer token 130 to electronic transaction terminal 104 using a wireless communication such as NFC. In particular embodiments, augmented reality user device 200 may encrypt transaction token 130.

Modifications, additions, or omissions may be made to the method of FIG. 3. Additionally, one or more steps in method 300 of FIG. 3 may be performed in parallel or in any suitable order.

FIG. 4 is a flowchart of an embodiment of a method of authenticating and authorizing an electronic transaction. Method 400 may be performed by any of the components described with respect to FIGS. 1 and 2. In particular embodiments, the electronic transaction terminal system includes a camera (e.g., camera 114 or 208) operable to capture an image of a person (e.g., user 102) participating in an electronic transaction; a microphone (e.g., Microphone 116 or 214) operable to capture an audio recording of the person participating in the electronic transaction; and a database (e.g., database 124) comprising one or more records associating one or more user accounts with an image of an associated account holder and a voice print of the associated account holder.

Method 400 begins at step 402, where an electronic transaction terminal captures an image of a person participating in an electronic transaction. For example, electronic transaction terminal 104 uses camera 114 to capture an image of user 102. The image may comprise an image of the face of user 102, a retinal scan of user 102, or any other suitable image to identify user 102.

In some embodiments, electronic transaction terminal 104 may be in communication with augmented reality user device 200. Augmented reality user device 200 may capture an image of user 102 using camera 208. Augmented reality user device 200 may transmit the image to electronic transaction terminal 104.

In some embodiments, electronic transaction terminal 104 may biometric information associated with user 102 using a fingerprint reader or any suitable capture device. In particular embodiments, the capture device may be included in electronic transaction terminal 104 or in communication with electronic transaction terminal 104.

At step 404, the electronic transaction terminal compares the captured image with one or more records in the database. For example, electronic transaction terminal 104 compares the captured retinal scan of user 102 with records in database 124 that include retinal scans of account holders.

In particular embodiments, database 124 may be co-located with electronic transaction terminal 104 or remote. Institution 122 may be the same institution operating electronic transaction terminal 104 (e.g., retailer) or a different institution (e.g., bank).

At step 406, the electronic transaction terminal identifies one or more user accounts associated with the person participating in the electronic transaction by matching the image of the person participating in the electronic transaction with the image of the account holder associated with the one or more user accounts. For example, electronic transaction terminal 104 may determine that the captured retinal scan of user 102 matches a retinal scan in database 124 associated with a credit card account of user 102.

If the electronic transaction terminal does not identify a match, then the electronic transaction terminal does not authorize the electronic transaction and the method may return to the start or jump to the end. If a match is found, the method continues to step 408.

At step 408, the electronic transaction terminal prompts the person participating in the electronic transaction to authorize the electronic transaction by speaking into the microphone. For example, electronic transaction terminal 104 may prompt user 102 to speak into microphone 116 or 214.

In particular embodiments, electronic transaction terminal 104 may display a message, turn on a light, etc. to prompt user 102 to authorize the transaction. In some embodiments, representative 120 may ask user 102 to verbally authorize the electronic transaction.

At step 410, the electronic transaction terminal captures an audio signal of the person participating in the electronic transaction speaking into the microphone. For example, electronic transaction terminal 104 may capture a recording of the voice of user 102 using microphone 116 or 214.

At step 412, the electronic transaction terminal compares the captured audio signal with the voice print associated with the one or more user accounts. For example, electronic transaction terminal 104 compares the voice recording of user 102 with the record in database 124 for the account of user 102 identified in step 406. The record in database 124 for the account of user 102 includes a voice print of user 102. Electronic transaction terminal 104 compares the voice recording of user 102 with the voice print in database 124.

At step 414, the electronic transaction terminal determining the captured audio signal matches the voice print associated with the one or more user accounts. For example, electronic transaction terminal 104 determines whether the voice recording of user 102 matches the voice print in database 124.

If the electronic transaction terminal determines a match is not found, the electronic transaction terminal does not authorize the electronic transaction and the method may return to the start or jump to the end. If a match is found, the method continues to step 416.

At step 414, the electronic transaction terminal authorizes the electronic transaction to proceed using the one or more user accounts. For example, electronic transaction terminal 104 may use the identified credit card account of user 102 to perform the electronic transaction.

Modifications, additions, or omissions may be made to the method of FIG. 4. Additionally, one or more steps in method 400 of FIG. 4 may be performed in parallel or in any suitable order.

For example, some embodiments may not perform the voice authorization steps 408 to 414. Particular embodiments may authorize the electronic transaction based on the match in step 406.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An augmented reality system comprising:
   an augmented reality user device and a digital wallet;
   the digital wallet comprising a database of one or more items associated with a user, at least one of the one or more items comprising a digital representation of a payment card;
   the augmented reality user device comprising:
      a display configured to overlay virtual objects onto a field of view of the user in real-time;
      a memory; and
      one or more processors coupled to the memory and to the display, wherein the one or more processors are configured to:
         wirelessly communicate with an electronic transaction terminal to determine the augmented reality user device is proximate the electronic transaction terminal before accessing a digital wallet;
         send a request for an inventory of the digital wallet, wherein the request comprises a unique identifier that corresponds with the augmented reality user device;
         receive the inventory of the digital wallet in response to the request, wherein the inventory comprising one or more items contained in the database of the digital wallet;
         overlay a graphical representation of the one or more items contained in the database of the digital wallet within the field of view of the user via the display;
         detect a hand gesture performed by the user, wherein the hand gesture comprises grabbing one of the one or more items displayed within the field of view of the user to be used for an electronic transaction with the electronic transaction terminal;
         identify one of the one or more items based on the detected hand gesture;
         generate a transfer token based on the identified item, the transfer token comprising information about a user account associated with the identified item; and
         transmit the transfer token to the electronic transaction terminal.

2. The augmented reality system of claim 1, wherein the digital wallet is stored in a mobile communications device.

3. The augmented reality system of claim 1, wherein the digital wallet is stored in cloud-based storage.

4. The augmented reality system of claim 1, wherein the digital wallet is stored in the memory of the augmented reality user device.

5. The augmented reality system of claim 1, the augmented reality user device further comprising a camera operable to obtain biometric information of the user wearing the display, and wherein the identifier of the augmented reality user device comprises biometric information obtained by the camera.

6. The augmented reality system of claim 5, wherein the biometric information comprises at least one of facial information or retina information.

7. The augmented reality system of claim 1, wherein the processor is operable to transmit the transfer token to the electronic transaction terminal using near field communication (NFC).

8. A method of performing an electronic transaction in an augmented reality system, the method comprising:
    wirelessly communicating with an electronic transaction terminal to determine an augmented reality user device is proximate electronic transaction terminal before accessing a digital wallet;
    sending a request for an inventory of a digital wallet, wherein:
        the request comprises a unique identifier that corresponds with the augmented reality user device; and
        the digital wallet comprising a database of one or more items associated with the user, at least one of the one or more items comprising a digital representation of a payment card;
    receiving the inventory of the digital wallet, the inventory comprising one or more items contained in the digital wallet;
    overlaying a graphical representation of the one or more items contained in the digital wallet within a field of view of the user via the display;
    detecting a hand gesture performed by the user, wherein the hand gesture comprises grabbing one of the one or more items displayed within the field of view of the user to be used for an electronic transaction with the electronic transaction terminal;
    identifying one of the one or more items based on the detected hand gesture;
    generating a transfer token based on the identified item, the transfer token comprising information about a user account associated with the identified item; and
    transmitting the transfer token to the electronic transaction terminal.

9. The method of claim 8, wherein the digital wallet is stored in a mobile communications device.

10. The method of claim 8, wherein the digital wallet is stored in cloud-based storage.

11. The method of claim 8, wherein the digital wallet is stored in the memory of the augmented reality user device.

12. The method of claim 8, the augmented reality user device further comprising a camera operable to obtain biometric information of the user wearing the display, and wherein the identifier of the augmented reality user device comprises biometric information obtained by the camera.

13. The method of claim 12, wherein the biometric information comprises at least one of facial information or retina information.

14. The method of claim 8, wherein transmitting the transfer token to the electronic transaction terminal uses near field communication (NFC).

15. An augmented reality device comprising:
    a display configured to overlay virtual objects onto a field of view of a user in real-time;
    a memory; and
    one or more processors coupled to the memory and to the display, wherein the one or more processors are configured to:
        wirelessly communicate with an electronic transaction terminal to determine the augmented reality device is proximate to the electronic transaction terminal before accessing a digital wallet;
        send a request for an inventory of the digital wallet, wherein:
            the request comprises a unique identifier that corresponds with the augmented reality user device; and
            the digital wallet comprises a database of one or more items associated with the user, at least one of the one or more items comprising a digital representation of a payment card;
        receive an inventory of the digital wallet in response to the request, wherein the inventory comprising one or more items contained in the digital wallet;
        overlay a representation of the one or more items contained in the digital wallet within the field of view of the user via the display;
        detect a gesture performed by the user, wherein the gesture comprises grabbing one of the one or more items displayed within the field of view of the user;
        identify one of the one or more items based on the detected gesture;
        generate a transfer token based on the identified item, the transfer token comprising information about a user account associated with the identified item; and
        transmit the transfer token to the electronic transaction terminal.

16. The augmented reality device of claim 15, wherein the digital wallet is stored in the memory of the augmented reality user device.

17. The augmented reality device of claim 15, the augmented reality user device further comprising a camera operable to obtain biometric information of the user wearing the display.

* * * * *